United States Patent [19]
Reinders

[11] Patent Number: 5,819,088
[45] Date of Patent: Oct. 6, 1998

[54] METHOD AND APPARATUS FOR SCHEDULING INSTRUCTIONS FOR EXECUTION ON A MULTI-ISSUE ARCHITECTURE COMPUTER

[75] Inventor: James R. Reinders, Beaverton, Oreg.

[73] Assignee: Intel Corporation, Santa Clara, Calif.

[21] Appl. No.: 36,947

[22] Filed: Mar. 25, 1993

[51] Int. Cl.$^6$ .................................................... G06F 9/00
[52] U.S. Cl. .......................................... 395/672; 395/706
[58] Field of Search .................................. 395/375, 650, 395/700, 800

[56] References Cited

U.S. PATENT DOCUMENTS

| | | | |
|---|---|---|---|
| 5,202,975 | 4/1993 | Rasbold et al. | 395/500 |
| 5,202,987 | 4/1993 | Bayer et al. | 395/650 |
| 5,202,993 | 4/1993 | Tarsy et al. | 395/700 |
| 5,317,734 | 5/1994 | Gupta | 395/650 |

OTHER PUBLICATIONS

Touzeau, R.F., A Fortran Compiler for the EPS–164 Scientific Compiler, Proceedings of the ACM SIGPLAN '84 Symposium on Compiler Construction, ACM SIGPLAN Notices, vol. 19, No. 6, Jun. 1984.

Cohn, R., et al., Architecture and Compiler Tradeoffs For a Long Instruction Word Processor, Third International Conference on Architecture Support for Programming Languages and Operating System, ACM SIGPLAN Notices, vol. 24, Special Issue May 1989.

Borker, S. et al., iWarp: An Integrated Solution to High–Speed Parallel Computing, Proceedings of the Supercomputing Conference, Orlando, Fl., Nov. 14–18, 1988, The Computer Society of the IEEE.

Lam, M., Software Pipelining: An Effective Scheduling Technique For VLIW Machines, SIGPLAN '88 Conference n Programming Language Design and Implementation, Atlanta, Georgia, Jun. 22–24, 1988, ACM SIGPLAN Notices, vol. 23, No. 7, Jul. 1988.

Lam, M., A Systolic Array Optimizing Compiler, Ph.D. Thesis, Dept. of Computer Science, Carnegie Mellon University, CMU–CS–87–187, 1987.

*Primary Examiner*—Kevin J. Teska
*Assistant Examiner*—Ayni Mohamed
*Attorney, Agent, or Firm*—Blakely, Sokoloff, Taylor & Zafman

[57] ABSTRACT

Improved parallelism in the generated schedules of basic blocks of a program being compiled is advantageously achieved by providing an improved scheduler to the code generator of a compiler targeting a multi-issue architecture computer. The improved scheduler implements the prior-art list scheduling technique with a number of improvements including differentiation of instructions into squeezed and non-squeezed instructions, employing priority functions that factor in the squeezed and non-squeezed instruction distinction for selecting a candidate instruction, tracking only the resources utilized by the non-squeezed instructions, and tracking the scheduling of the squeezed and non-squeezed instructions separately. When software pipelining is additionally employed to further increase parallelism in program loops, the improved scheduler factors only the non-squeezed instructions in the initial minimum schedule (initiation internal) size calculation.

24 Claims, 15 Drawing Sheets

|  | res(r-1) | res(r-2) | ... | res(0) |
|---|---|---|---|---|
| slot (n-1) | | | | |
| slot (n-2) | | | | |
| | | | | |
| slot (0) | | | | |

|  | Non-Squeezed Lists | Squeezed Lists |
|---|---|---|
| slot (m-1) | | |
| slot (m-2) | | |
| | | |
| slot (0) | | |

```
double s1, s2, c1, c2, c3, t1, t2;
int n;
for (i=0, i<n; i+t) {
    t1 = received (gate 0);
    t2 = received (gate 1);
    s1* = (t1 + t1 + c1) * c2;
    s2 + - (t2 + t2) / c3 / received (gate 1);
}
```
92a

Figure 7a

```
DOUBLE PRECISION S1, S2, C1, C2, C3, T1, T2
INTEGER N
DD 120 I = 0, N
    T1 = RECEIVED (GATE 0)
    T2 = RECEIVED (GATE 1)
    S1 = S1* ((T1 + T1 + C1) *C2)
    S2 = S2 + ((T2 + T2) / C3) / RECEIVED (GATE 1)
120 CONTINUE
```
92b

Figure 7b

| | | |
|---|---|---|
| instr - 1 | add | gate0, gate0, t1 |
| instr - 2 | add | t1, c1, t1 |
| instr - 3 | multiply | t1, c2, t1 |
| instr - 4 | multiply | s1, t1, s1 |

<u>94</u>

| | | |
|---|---|---|
| instr - 5 | add | gate1, gate1, t2 |
| instr - 6 | divide | t2, c3, t2 |
| instr - 7 | divide | t2, gate1, t2 |
| instr - 8 | add | s2, t2, s2 |

```
add       gate0, gate0, t1
add       t1, c1, t1
multiply  t1, c2, t1              add       gate1, gate1, t2
                                  divide    t2, c3, t2
                                  divide    t2, gate1, t2
multiply  s1, t1, s1              add       s2, t2, s2
```

```
add       gate0, gate0, t1
                                  add       gate1, gate1, t2
add       t1, c1, t1
                                  divide    t2, c3, t2
multiply  t1, c2, t1
                                  divide    t2, gate1, t2
multiply  s1, t1, s1              add       s2, t2, s2
```

Figure 10b

METHOD AND APPARATUS FOR SCHEDULING INSTRUCTIONS FOR EXECUTION ON A MULTI-ISSUE ARCHITECTURE COMPUTER

BACKGROUND OF THE INVENTION

1. Field of the Invention

The present invention relates to the field of computer systems, in particular, computer systems that support multiple instruction issues, also known as superscalar computer systems. More specifically, the present invention relates to instruction scheduling performed by compilers targeting these computer systems.

2. Background

Various compiler scheduling techniques are employed in the art for scheduling a basic instruction block targeted for a multi-issue architecture computer system, also known as a superscalar computer system. Their common objective is to find the shortest schedule that maximizes the amount of parallel execution for the basic block. The common constraints they face are in resource and precedence. At any instance in time, the total usage of any type of resources by the instructions to be executed in parallel must not exceed the resources available on the targeted machine for the particular resource type. Additionally, instructions with dependencies on other instructions cannot be scheduled before their dependencies are resolved.

Among these prior-art techniques, list scheduling is probably the most popular, perhaps because of its effectiveness and ease of implementation. Under list scheduling, the "optimal" schedule is determined iteratively using a candidate instruction list comprising candidate instructions that are ready to be scheduled. At each iteration, a candidate instruction is selected for scheduling based on some priority functions. The "best" schedule slot, without violating the resource and precedence constraints, is assigned to the selected instruction. The candidate list is then refreshed, and the process is repeated until the candidate list becomes empty. Typically, the candidate instructions for the candidate instruction list are identified using either a "top down" (predecessor free) or a "bottom up" (successor free) approach, and the priority functions for selecting one of the candidate instructions are evaluated without distinguishing instructions that can be issued with other instructions from instructions that cannot be issued with any other instructions.

For basic blocks that are program loops, software pipelining has been additionally employed to further increase the amount of parallelism by exploiting the repetitive nature of program loops. Under software pipelining, subject also to resource and precedence constraints, a program loop is continuously initiated at constant intervals, before the preceding iterations complete. At steady state, n iterations are concurrently being executed, each iteration potentially having multiple instructions scheduled for parallel execution. Thus, at any instance in time, the total usage of any type of resources by the instructions of one iteration of the program loop to be executed in parallel must not exceed the modulo resources available on the targeted machine for the particular resource type for one iteration of the program loop. As a result, an attempt to list schedule a program loop with software pipelining may fail for a particular schedule size. Therefore, when list scheduling with software pipelining is employed to schedule a program loop, the "optimal" schedule is determined through repeated attempts to schedule the program loop in schedules of various schedule sizes, typically starting with the smallest schedule (maximum compaction) and gradually increasing the schedule size towards the largest schedule (zero compaction). For each attempt, the program loop is list scheduled as described earlier. If the attempt fails, the process is repeated until either an attempt is successful or the largest schedule (zero compaction) is reached.

Since it is not uncommon for programs to include program loops that get executed over and over again, even a single instruction saving in the execution schedule could still potentially mean a large amount of savings in execution time. Therefore, while the prior art list scheduling technique, with or without software pipelining, generally generates pretty effective schedules, it is nevertheless desirable if it can be improved upon. As will be disclosed, the present invention provides an improved method and apparatus for list scheduling instructions of a basic block targeted for a multi-issue architecture computer system.

NOTATION AND NOMENCLATURE

In the context of the present invention, a squeezed instruction is an instruction that cannot be scheduled for parallel execution with any other instructions on the targeted machine. On the other hand, a non-squeezed instruction is an instruction that can be scheduled for parallel execution with at least one other instruction on the targeted machine.

SUMMARY OF THE INVENTION

The improved parallelism in the generated schedules of the basic blocks of a program being compiled is advantageously achieved under the present invention by providing an improved scheduler incorporated with the teachings of the present invention to the code generator of a compiler. The improved scheduler implements the prior-art list scheduling technique with a number of improvements including the differentiation of squeezed and non-squeezed instructions, employing priority functions that factor in the squeezed and non-squeezed instruction distinction for selecting a candidate instruction, tracking only the resources utilized by the non-squeezed instructions, and tracking the scheduling of the squeezed and non-squeezed instructions separately.

More specifically, in one embodiment, the improved scheduler employs a resource utilization array and an instruction tracking array to determine whether a basic block can be scheduled with a schedule of a particular schedule size. The resource utilization array is initialized to a size that is sufficiently large for the targeted machine's architecture. The resource utilization array is used to track only the resources utilized by the non-squeezed instructions. The instruction tracking array is initialized in accordance to the number of instructions in the basic block. The instruction tracking array is used to track the scheduling of the squeezed and non-squeezed instructions separately.

Additionally, in this embodiment, the improved scheduler identifies the candidate instructions for the candidate instruction list using a bottom up (successor free) approach. At each iteration, the improved scheduler selects a candidate instruction to schedule based on the relative chain lengths of the predecessor non-squeezed instruction chains. The presence of squeezed instructions in a predecessor chain is considered only for tie-breaking, in the event that there are more than one predecessor non-squeezed instruction chain having the same longest chain length.

When software pipelining is additionally employed to list schedule a program loop, the improved scheduler repeatedly attempts to schedule the program loop for various schedule sizes as described above, starting with the smallest schedule (maximum compaction) and systematically increasing the schedule size towards the largest schedule (zero compaction) until either an attempt is successful or the largest schedule is reached. However, the improved scheduler factors only the non-squeezed instructions in the smallest schedule (initiation internal) size calculation.

BRIEF DESCRIPTION OF THE DRAWINGS

The objects, features, and advantages of the present invention will be apparent from the following detailed description of the presently preferred and alternate embodiments of the invention with references to the drawings in which:

FIGS. 4a–4b illustrate the resource utilization array and the instruction tracking array employed by the improved scheduler of FIG. 3b to determine whether a basic block can be scheduled with a schedule of a particular schedule size under the present invention.

FIGS. 7a–7b illustrate an exemplary program loop in C and FORTRAN.

FIGS. 8a–8b illustrate the exemplary instructions to be scheduled for the exemplary program loop of FIGS. 7a–7b, and the precedence constraints on scheduling these exemplary instructions.

FIGS. 10a–10b contrast the schedules generated for the exemplary instructions of FIGS. 7a–7b under the present invention and the prior art.

DETAILED DESCRIPTION PRESENTLY PREFERRED AND ALTERNATE EMBODIMENTS

In the following description for purposes of explanation, specific numbers, materials and configurations are set forth in order to provide a thorough understanding of the present invention. However, it will be apparent to one skilled in the art that the present invention may be practiced without the specific details. In other instances, well known systems are shown in diagrammatical or block diagram form in order not to obscure the present invention unnecessarily.

Figure 1:
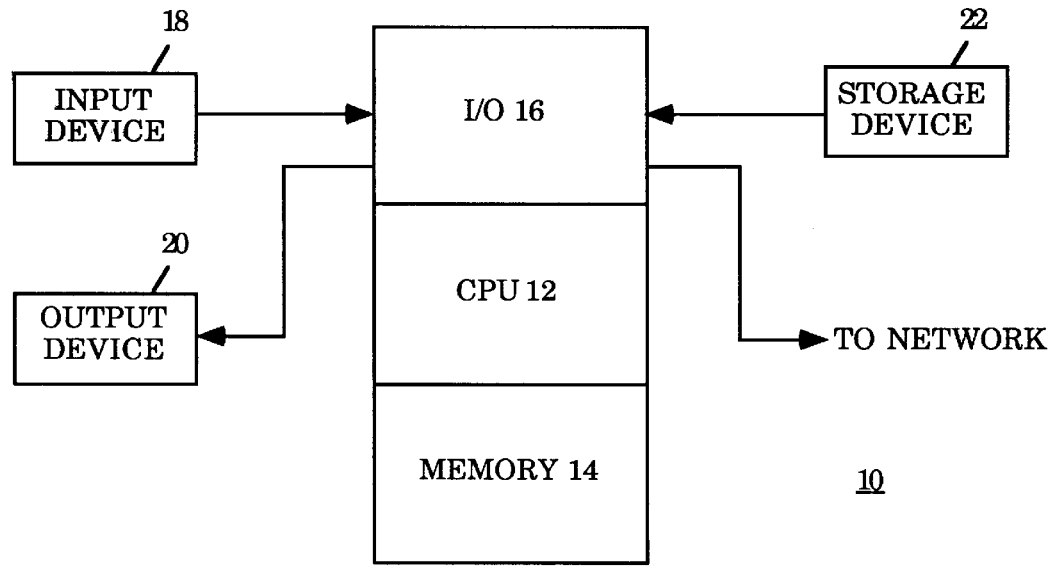
FIG. 1 illustrates an exemplary computer system incorporated with the teachings of the present invention.

Referring now to FIGS. 1, a block diagram illustrating an exemplary multi-issue architecture computer system incorporated with the teachings of the present invention is shown. The exemplary multi-issue architecture computer system 10 comprises a central processing unit (CPU) 12, a memory 14, and an I/O module 16. Additionally, the exemplary multi-issue architecture computer system 10 also comprises a number of input/output devices 18 and 20, and a number of storage devices 22. The CPU 12 is coupled to the memory 14 and the I/O module 16. The input/output devices, 18 and 20, and the storage devices 22 are also coupled to the I/O module 16. The I/O module 16 in turn is coupled to a network.

The CPU 12 comprises an instruction dispatcher (not shown) for fetching and dispatching multiple instructions simultaneously. Additionally, the CPU 12 comprises resources such as integer units, floating point units (not shown) for executing these simultaneously issued instructions in parallel. Except for the manner it is used to practice the present invention, the CPU 12 is intended to represent a broad category of execution units found in many multi-issue architecture or superscalar computers. Similarly, except for the manner they are used to practice the present invention, the memory 14, the I/O module 16, the input/output devices, 18 and 20, the storage devices 22, and the network, are intended to represent a broad category of these hardware elements found in most computer systems. Thus, the constitutions and basic functions of these elements are well known and therefore will not be otherwise further described.

Figure 2:
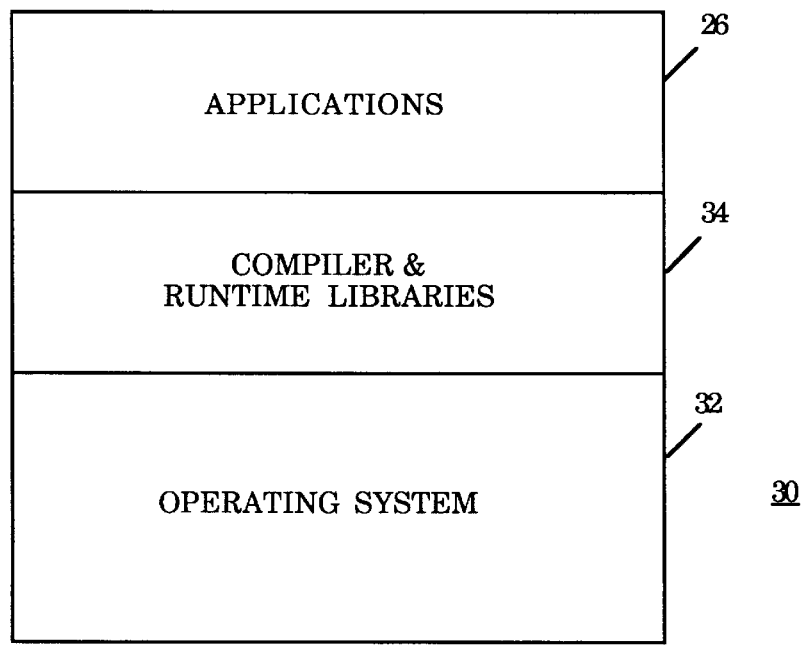
FIG. 2 illustrates the software elements of the exemplary computer system of FIG. 1.

FIG. 2 illustrates the software elements of the exemplary computer system of FIG. 1. Shown are application programs 26 compiled using the compiler 34 incorporated with the teachings of the present invention. The compiled application programs 26 access the runtime libraries 34 for services during execution, which in turn access the operating system 32 for system services. The compiler 34 also accesses the operating system 32 for system services during compilation of application programs 26. Similar to the hardware elements, except for teachings of the present invention incorporated in the compiler 34, these software elements are intended to represent a broad category of similar software elements found in most computer systems. The constitutions and basic functions of these elements are well known and will not be otherwise further described.

While for ease of explanation, the present invention is being described with the compiler incorporated with the teachings of the present invention executing on a multi-issue architecture computer system, it will be appreciated that the present invention may be practiced with the improved compiler executing on a standard scalar computer, only the generated instructions have to be executed on a multi-issue architecture computer.

Figure 3A:
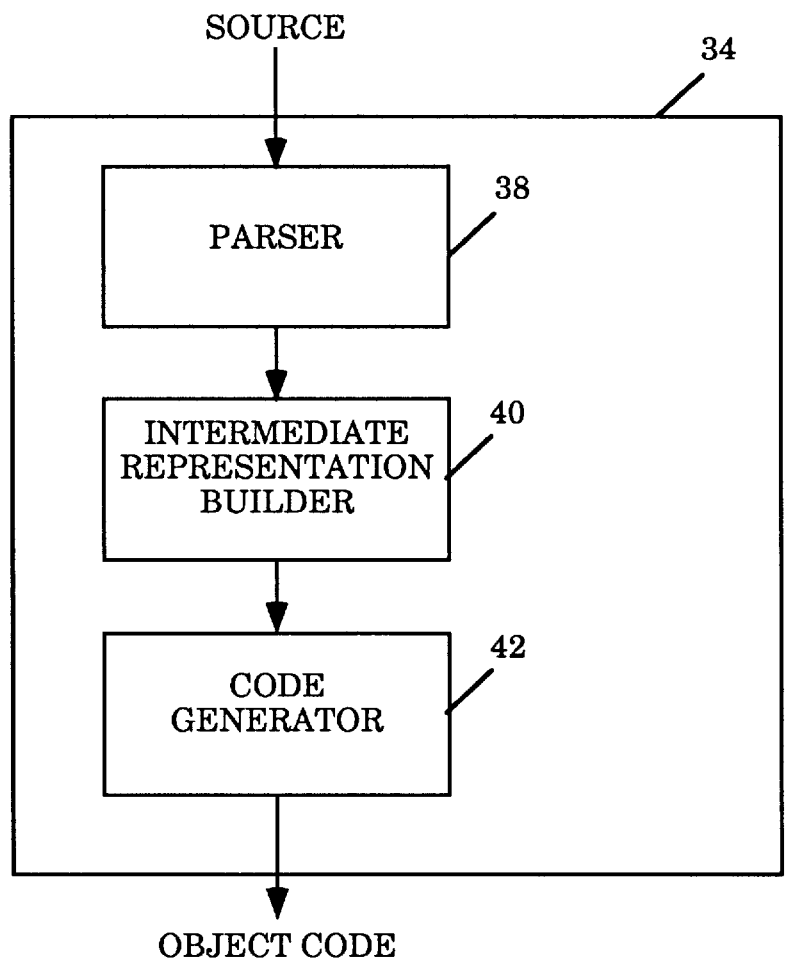
FIGS. 3a–3b illustrate one embodiment of the exemplary compiler of FIG. 2.
Figure 3B:
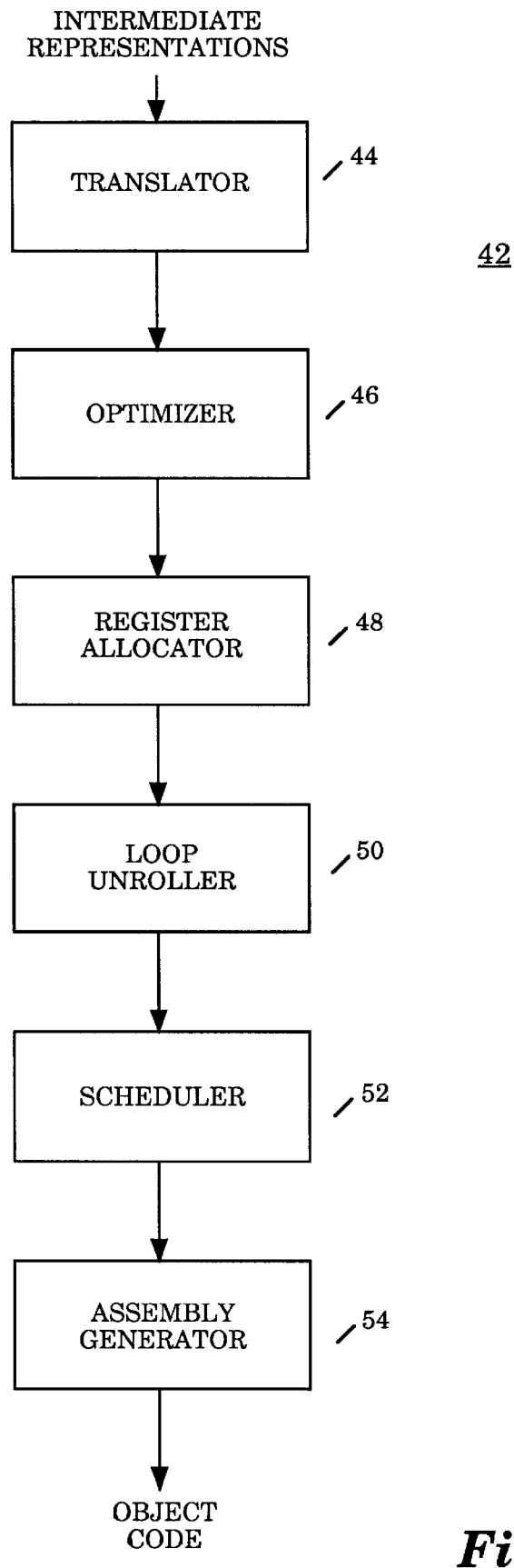

Referring now to FIGS. 3a–3b, two block diagrams illustrating one embodiment of the compiler of FIG. 2 is shown. As illustrated in FIG. 3a, in this embodiment, the compiler 34 comprises a parser 38, an intermediate representation builder 40, and a code generator 42 incorporated with the teachings of the present invention. The parser 38 receives the source code of a program to be compiled as inputs. In response, it parses the source language statements and outputs tokenized statements. The intermediate representation builder 40 receives the tokenized statements as inputs. In response, it constructs intermediate representations for the tokenized statements. The code generator 42 receives the intermediate representations as inputs. In response, it generates object code for the program. Except for teachings of the present invention incorporated in the code generator 42, these components are intended to represent a broad category of similar components found in most compilers. The constitutions and basic functions of these components are well known and will not be otherwise further described here.

As illustrated in FIG. 3b, in this embodiment, the code generator 42 comprises a translator 44, an optimizer 46, a register allocator 48, a loop unroller 50, a scheduler 52, and an assembly code generator 54. The translator 44 receives the intermediate representations as inputs. In response, the translator 44 builds the loop table, orders instruction blocks, constructs data flow graphs etc. The optimizer 46 receives the intermediate representations and associated information as inputs, including the loop table and the data flow graph. In response, it performs various optimizations. The register allocator 48 receives the optimized intermediate representations and associated information as inputs. In response, it allocates registers of the exemplary multi-issue architecture computer system of FIG. 1 to the instructions being generated. The loop unroller 50 receives the optimized intermediate representations with allocated registers and associated information as inputs. In response, it restructures the instructions being generated, unrolling loops in the instructions being generated for an optimal amount of time consistent with the resources available in the exemplary multi-issue architecture computer system of FIG. 1. The scheduler 52 receives the restructured intermediate representations and associated information as inputs. In response, it further restructures the instructions to be generated for parallelism. Lastly, the assembly code generator 54 receives the optimized, register allocated, and restructured intermediate representations and associated information as inputs. In response, it generates the object code for the program being compiled. Except for the teachings of the present invention incorporated in the scheduler 52, the optimizer 46, the translator 44, the register allocator 48, the loop unroller 50, and the assembly code generator 54, are intended to represent a broad category of similar modules found in most code generators. The constitutions and basic functions of these modules are well known and will not be otherwise further described.

While for ease of understanding, the code generator 42 is being described with the above described embodiment which allocates registers before unrolling the loops in the instructions being generated and scheduling instructions for parallelism, based on the descriptions to follow, it will be appreciated that the present invention may be practiced with other register allocation, loop unrolling and scheduling approaches having different register allocation, loop unrolling and scheduling order.

Referring now to FIGS. 4a–4b, two block diagrams illustrating the resource utilization and instruction tracking arrays employed by the improved scheduler of FIG. 3b are shown. The resource utilization array 56 and the instruction tracking array 58 are employed by the improved scheduler to determine whether a basic block can be scheduled in a schedule of a particular schedule size. The resource utilization array 56 is used to track the resource utilization of the non-squeezed instructions, i.e. those instructions that can be scheduled for parallel execution with other instructions. As will be discussed in further detail later, the resource utilization of the squeezed instruction, i.e. those instructions that cannot be scheduled for parallel execution with any other instruction, are not tracked. The resource utilization array 56 comprises n rows, one for each non-squeezed schedule slot of the schedule under consideration, and r columns, one for each resource element to be tracked. The resource utilization array 56 is initialized in accordance with the schedule size being considered. When list scheduling a basic block without software pipelining, the schedule size is set to a size that is sufficiently large for the targeted machine, which is architecturally dependent. When list scheduling a program loop with software pipelining, the schedule size is set to different sizes for different attempts. The instruction tracking array 58 is used to track and link the scheduling of the squeezed and non-squeezed instructions separately. The instruction tracking array 58 comprises m rows, one for each schedule slot of the uncompacted schedule, and two (2) columns, one each for separately tracking and linking the scheduling of the squeezed and the non-squeezed instructions. Thus, the instruction tracking array 58 is always initialized with the same size.

Figure 5:
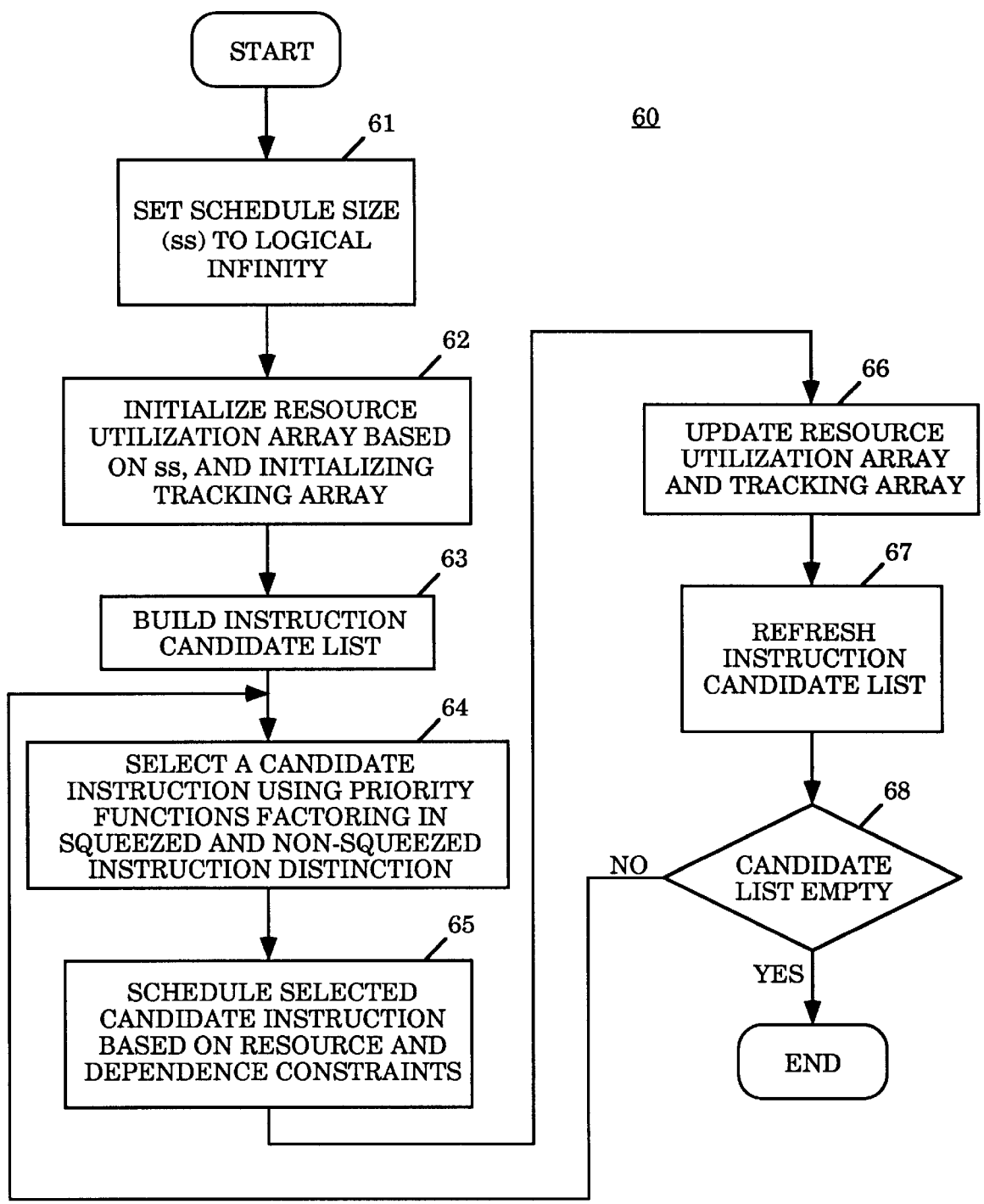
FIG. 5 illustrates the improved list scheduling technique of the present invention for scheduling a basic block.

Referring now to FIG. 5, a block diagram illustrating the improved list scheduling technique of the present invention for scheduling a basic block is shown. Initially, the improved scheduler sets the schedule size (ss), step 61. As described earlier, the schedule size is set to a size sufficiently large for the target machine, which is architecturally dependent. In one embodiment, ss is set to logical infinity. Upon setting the schedule size, the improved scheduler initializes the resource utilization and the instruction tracking arrays, step 62. As described earlier, the resource utilization array is initialized in accordance to the schedule size, whereas the instruction tracking array is initialized in accordance to the uncompacted size of the basic block. Upon initializing the arrays, the improved scheduler builds an instruction candidate list, step 63. Similar to the prior art list scheduling technique, the instruction candidate list may be built using a top down (predecessor free) approach or a bottom up (successor free) approach.

The improved scheduler then evaluates one or more priority functions to select one of the candidate instructions to schedule, step 64. The improved scheduler employs priority functions that distinguish squeezed instructions from non-squeezed instructions. In one embodiment, the improved scheduler selects one of the candidate instructions based on the relative chain lengths of the non-squeezed instruction chains originating from the candidate instructions. The candidate instruction with the longest chain length is selected. In other words, the squeezed instructions are not included in the chain length determinations. However, in this embodiment, the squeezed instructions are used for tie breaking. More specifically, when two candidate instructions have the same chain length, the candidate instruction with more squeezed instructions in its chain is selected over the candidate instruction with less squeezed instructions in its chain. Additionally, when no squeezed instructions are available for tie breaking, the tied candidate instruction has been ready to be scheduled for the longest time is selected over the other tied candidate instructions.

After selecting the candidate instruction, the improved scheduler schedules the selected instruction in one of the available schedule slot, without violating the resource and precedence constraints, step 65. Then, the improved scheduler updates the resource utilization and instruction tracking array accordingly, to denote the usage of a particular resource at a particular schedule slot, and to track and link the scheduled instruction to a schedule slot, step 66. As described earlier, the resource utilization array is updated only if the scheduled instruction is a squeezed instruction, and the appropriate column in the instruction tracking array is updated depending on whether the scheduled instruction is a squeezed or non-squeezed instruction. Upon updating the two arrays, the instruction candidate list is refreshed, step 67. If the refreshed candidate instruction list is non-empty, no branch of step 68, steps 64–67 are repeated. On the other hand, if the refreshed candidate instruction list is empty, yes branch of step 68, the process is terminated.

Figure 6A:
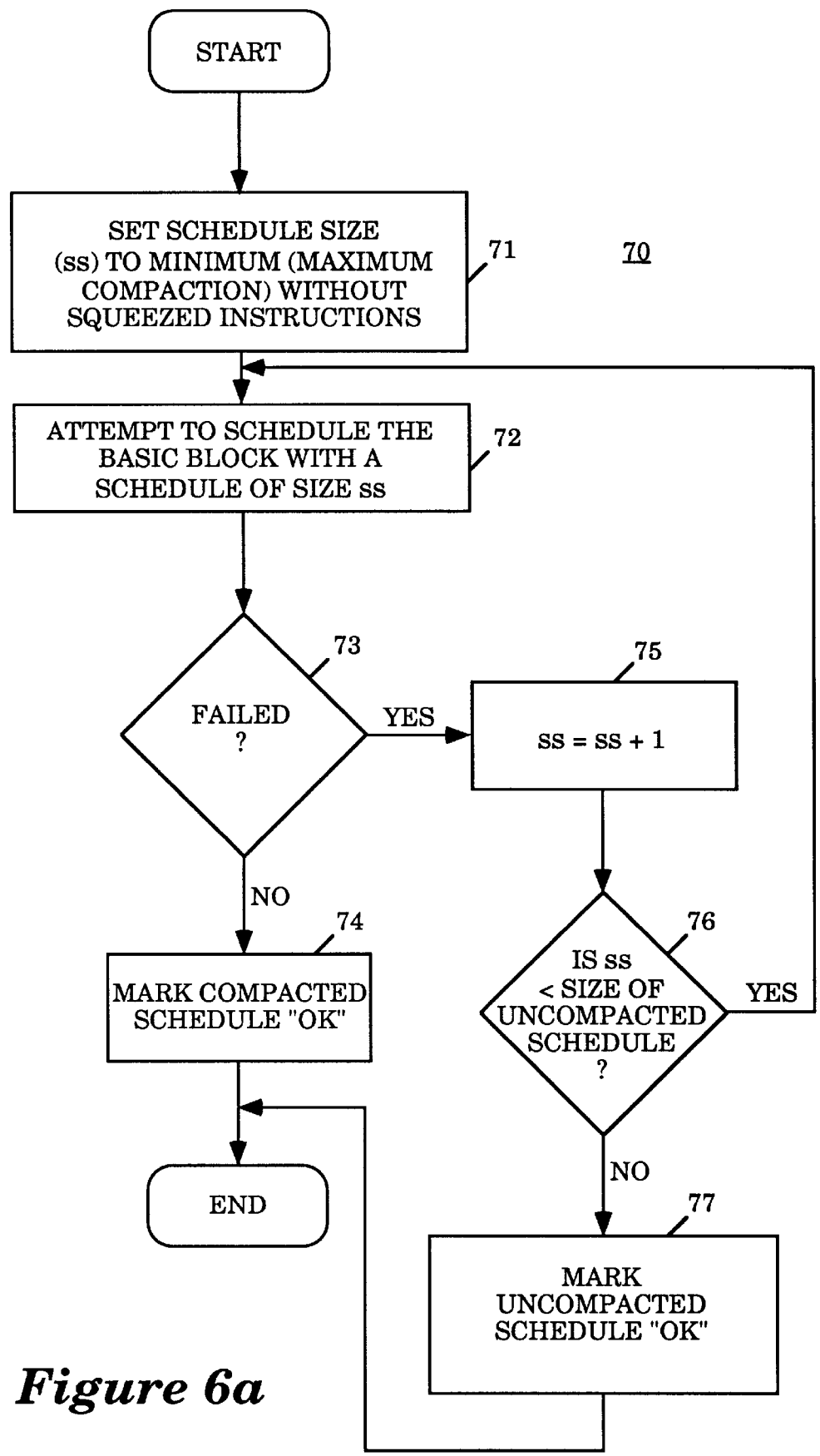
FIGS. 6a–6b illustrate the improved list scheduling technique of the present invention for scheduling a program loop when software pipelining is additionally employed.
Figure 6B:
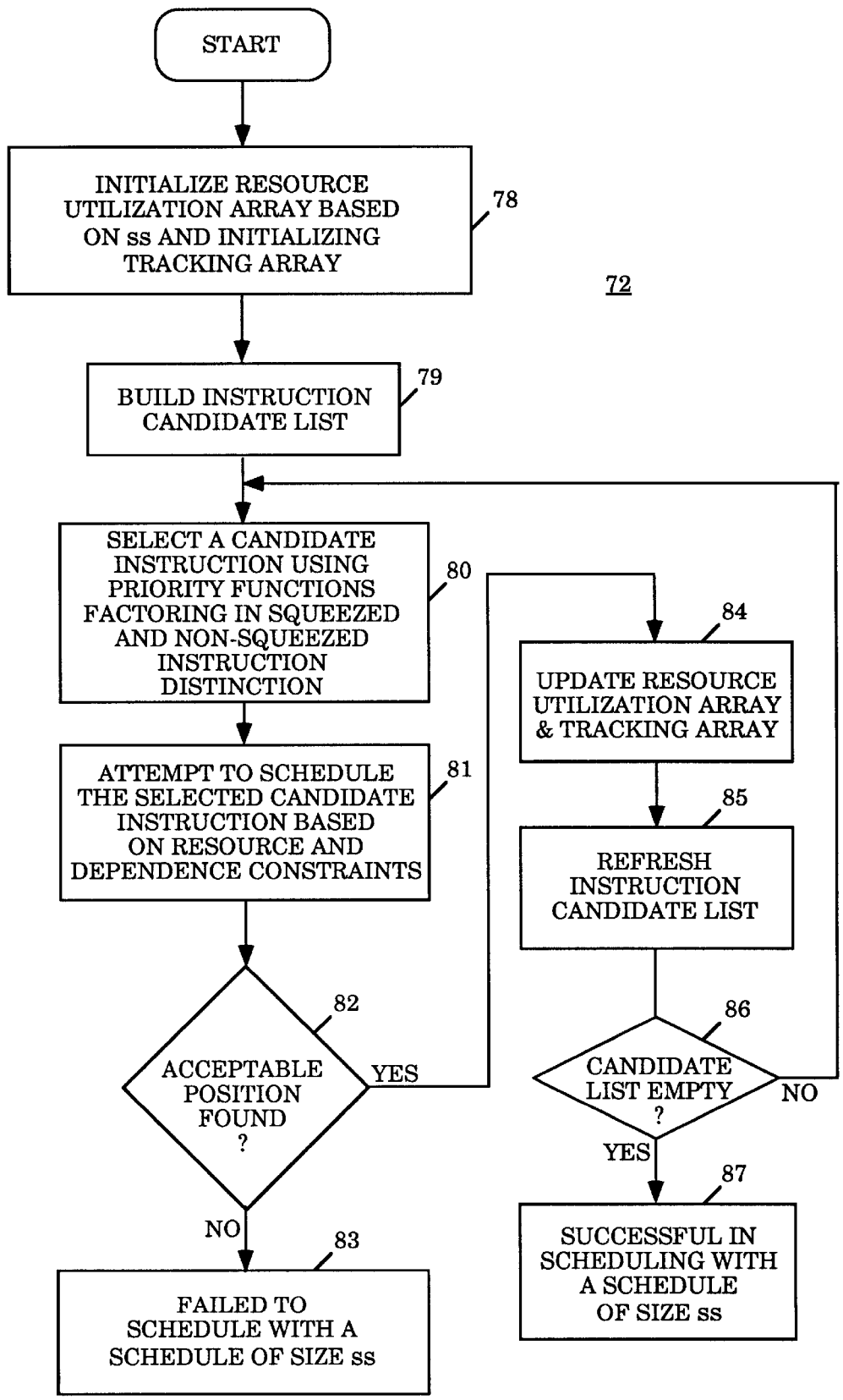

Referring now to FIGS. 6a–6b, two block diagrams illustrating the improved list scheduling technique of the present invention for scheduling a program loop with software pipelining additionally employed are shown. As illustrated in FIG. 6a, initially the improved scheduler sets the schedule size (ss) to the smallest schedule size possible (maximum compaction) without considering the squeezed instructions, step 71. In other words, if the program loop has five (5) squeezed instructions and seven (7) non-squeezed instructions, and six (6) of the seven (7) non-squeezed instructions can be issued in two-instruction pairs, the smallest schedule size without considering the squeezed instructions is four (4). Upon setting the schedule size, the improved scheduler attempts to schedule the program loop with a schedule of size ss, step 72. If the improved scheduler is successful, no branch of step 73, an optimal schedule is found for the program loop, step 74.

On the other hand, if the improved scheduler is unsuccessful, yes branch of step 73, the schedule size is incremented by one (1), step 75. If the incremented schedule size is still less than the uncompacted size of the program loop, yes branch of step 76, another attempt is made to schedule the program loop with a schedule of size ss, step 72. The process continues until either the improved scheduler is successful in scheduling the program loop with a schedule of size ss, no branch of step 73 or the incremented schedule size equals the uncompacted size of the basic block, no branch of step 76.

FIG. 6b illustrates the process step of attempting to schedule the program loop with a schedule of size ss, step 72, in further detail. The process steps are essentially the same process steps described for scheduling a basic block, except the improved scheduler may fail to find a schedule slot for the selected candidate instruction, steps 81–82, due to the modulo resource constraint. In that event, the attempt has failed, step 83.

Figure 8B:
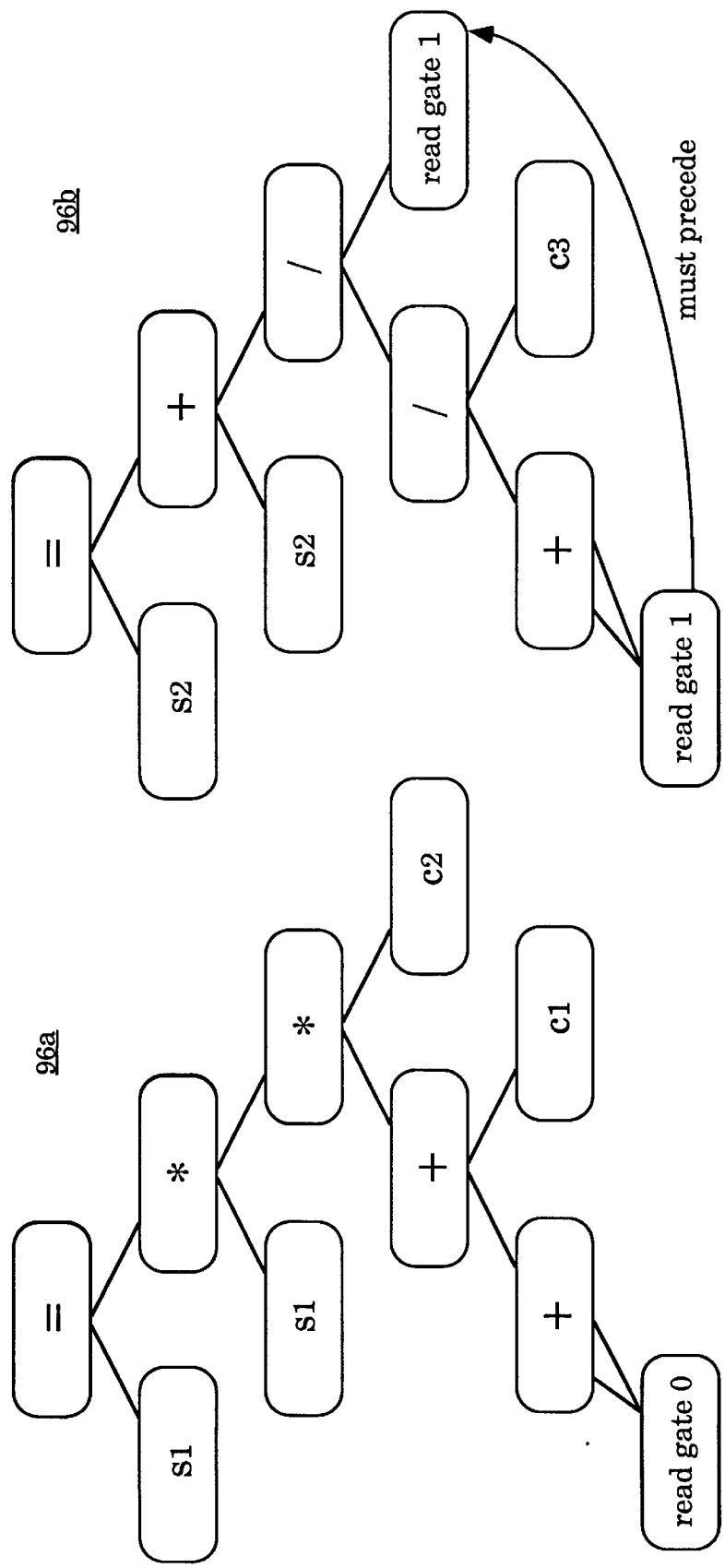

Referring now to the remaining figures, an exemplary scheduling of an exemplary program loop under the present invention is illustrated. Although the exemplary scheduling will be illustrated with software pipelining additionally employed, for ease of explanation, an exemplary program loop that does not lend itself to overlapping initiations of iterations will be used. FIGS. 7a–7b illustrate the exemplary program loop in C and FORTRAN. FIGS. 8a–8b illustrate the exemplary instructions in the corresponding program loop to be scheduled, and the precedence constraints of these exemplary instructions. For the purpose of this illustration, it is assumed that the target machine supports the simultaneous issuance of two instructions at a time. However, only an Add and a Multiply instruction can be issued together (non-squeezed instructions). A Divide instruction cannot be issued with any other instruction (squeezed instruction). Additionally, the candidate instructions will be identified using the bottom up (successor free) approach. The relative chain lengths of the predecessor non-squeezed instruction chains of the candidate instructions are uses to select candidate instructions. The presence of squeezed instructions in a predecessor chain is considered only for tie breaking.

Figure 9A:
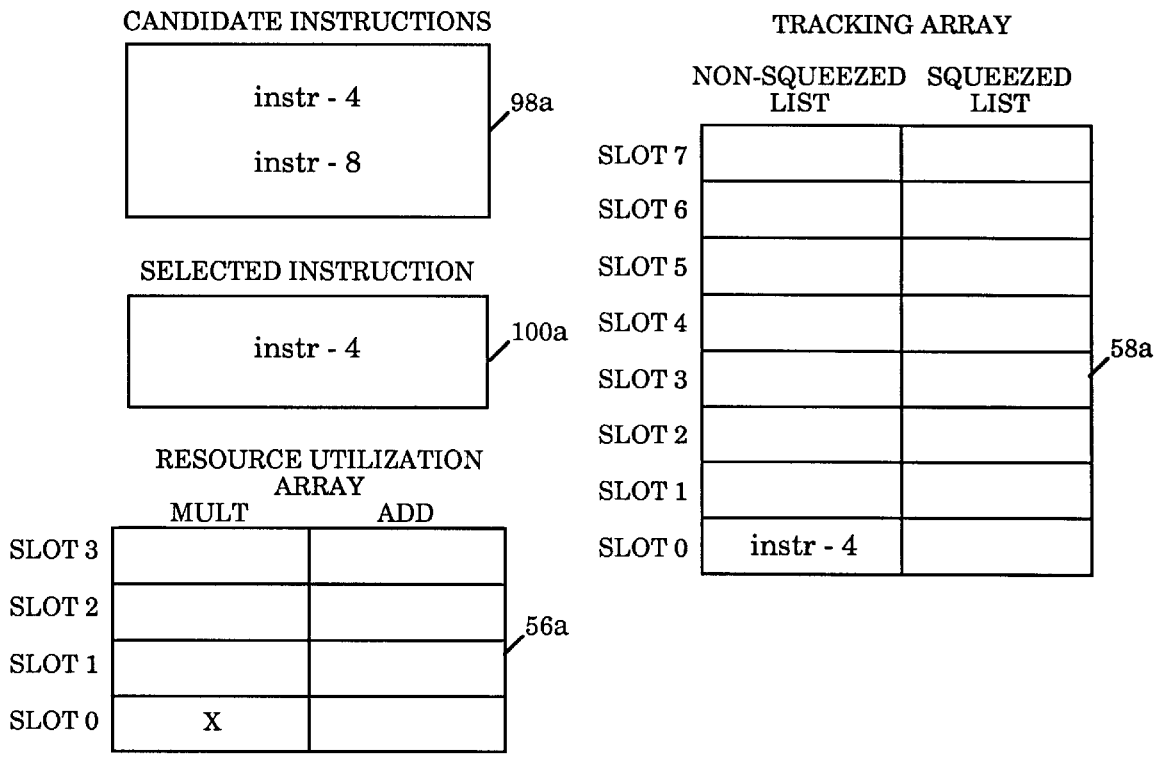
FIGS. 9a–9h illustrate the process for scheduling the exemplary instructions of FIGS. 7a–7b.

As described earlier, the improved scheduler first sets the schedule size to the smallest schedule size possible (maximum compaction) without considering the squeezed instructions. Since there are four Add instructions and two Multiply instructions, thus the smallest schedule size possible, ignoring the Divide instructions, is four. FIGS. 9a–9h illustrate the improved scheduler's attempt to schedule these exemplary instructions with a schedule of size 4. As illustrated in FIG. 9a, the improved scheduler builds a candidate instruction list 98a (using the bottom up approach). At this time, the candidate instruction list 98a comprises instr-4, a Multiply instruction, and instr-8, an Add instruction. Since instr-4, the Multiply instruction, originates a predecessor non-squeezed instruction chain with 4 non-squeezed instructions, which is longer than the 2 non-squeezed instructions predecessor non-squeezed instruction chain which originates from instr-8, the Add instruction, instr-4, the Multiply instruction, is selected over instr-8, the Add instruction, 100a. Since all resources are available, and no instructions have been scheduled at this time, the selected Multiply instruction (instr-4) is scheduled for the latest schedule slot, slot 0. Thus, the multiplication resource is marked used for slot 0, 56a, and instr-4, the Multiply instruction, is tracked in the non-squeezed list and linked to slot 0, 58a.

Figure 9B:
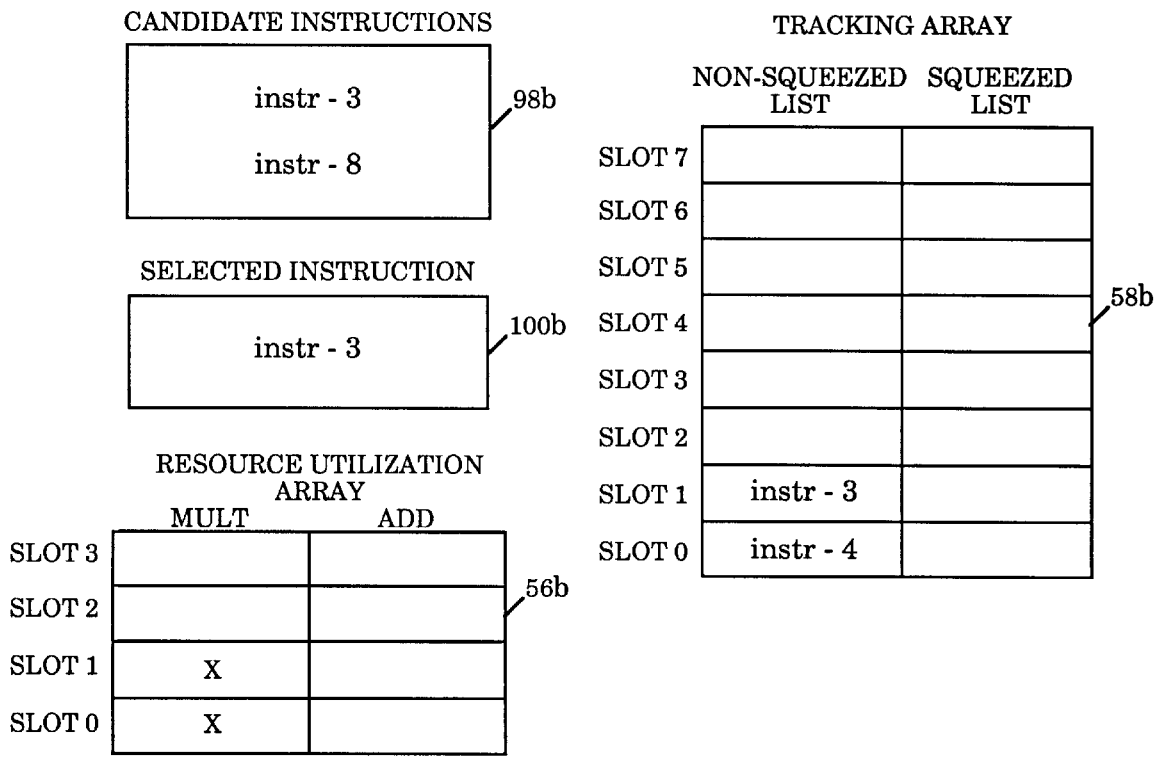

Next, as illustrated in FIG. 9b, the improved scheduler refreshes the candidate instruction list 98b. At this time, the candidate instruction list 98b comprises instr-3, a Multiply instruction, and instr-8, an Add instruction. Since instr-3, the Multiply instruction, originates a predecessor non-squeezed instruction chain with 3 non-squeezed instructions, which is longer than the 2 non-squeezed instructions predecessor non-squeezed instruction chain which originates from instr-8, the Add instruction, instr-3, the Multiply instruction, is selected over instr-8, the Add instruction, 100b. Since the multiplication resource is used in schedule slot 0, and instr-3 must be executed before instr-4, the selected Multiply instruction (instr-3) is scheduled for slot 1. Thus, the multiplication resource is marked used for slot 1, 56b, and instr-3, the Multiply instruction, is tracked in the non-squeezed list and linked to slot 1, 58b.

Figure 9C:
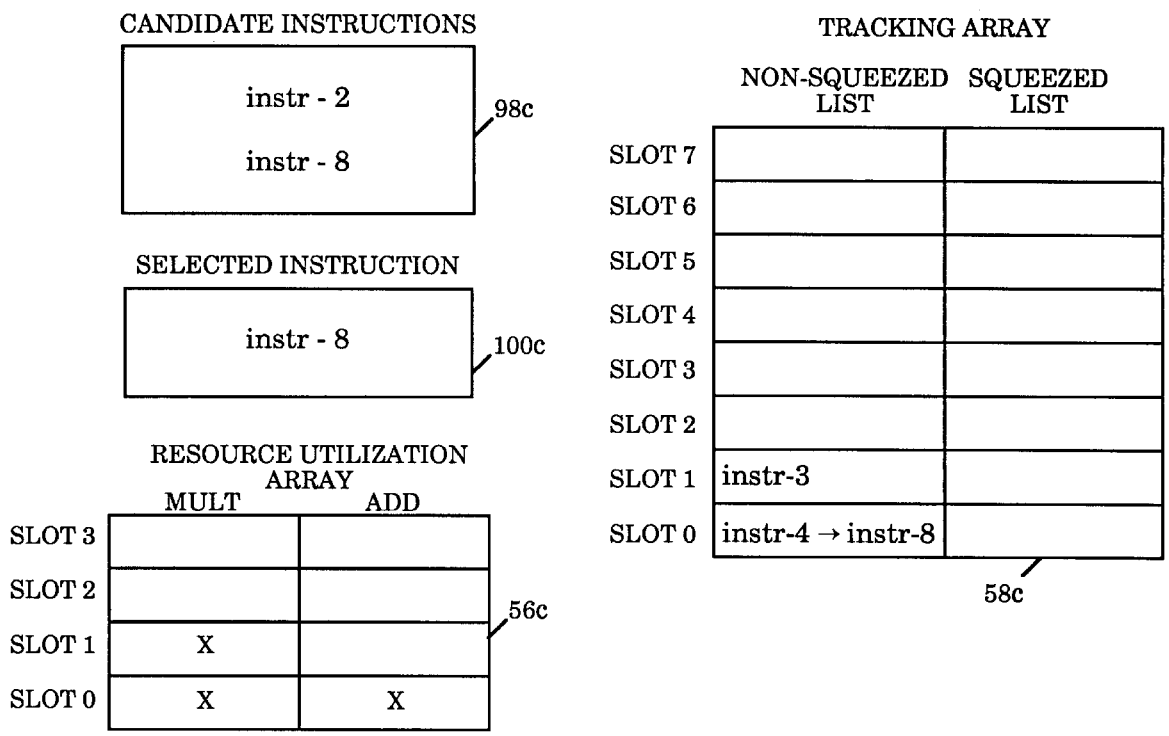

As illustrated in FIG. 9c, the improved scheduler refreshes the candidate instruction list again 98c. At this time, the candidate instruction list 98c comprises instr-2, an Add instruction, and instr-8, also an Add instruction. Since both instr-2 and instr-8 originate predecessor non-squeezed instruction chains with 2 non-squeezed instructions. The two Divide instructions in instr-8's predecessor chain are used for tie breaking. As a result, instr-8, the Add instruction, is selected over instr-2, the other Add instruction, 100c. Since the addition resource is available in schedule slot 0, and instr-8 does not have to be executed before any other instructions, the selected Add instruction (instr-8) is scheduled for slot 0. Thus, the addition resource is marked used for slot 0, 56c, and instr-8, the Add instruction, is tracked in the non-squeezed list and linked to slot 1 through instr-4, 58c. It will be appreciated that a newly scheduled instruction may be linked at the beginning or the end of the list associated with a schedule slot.

Figure 9D:
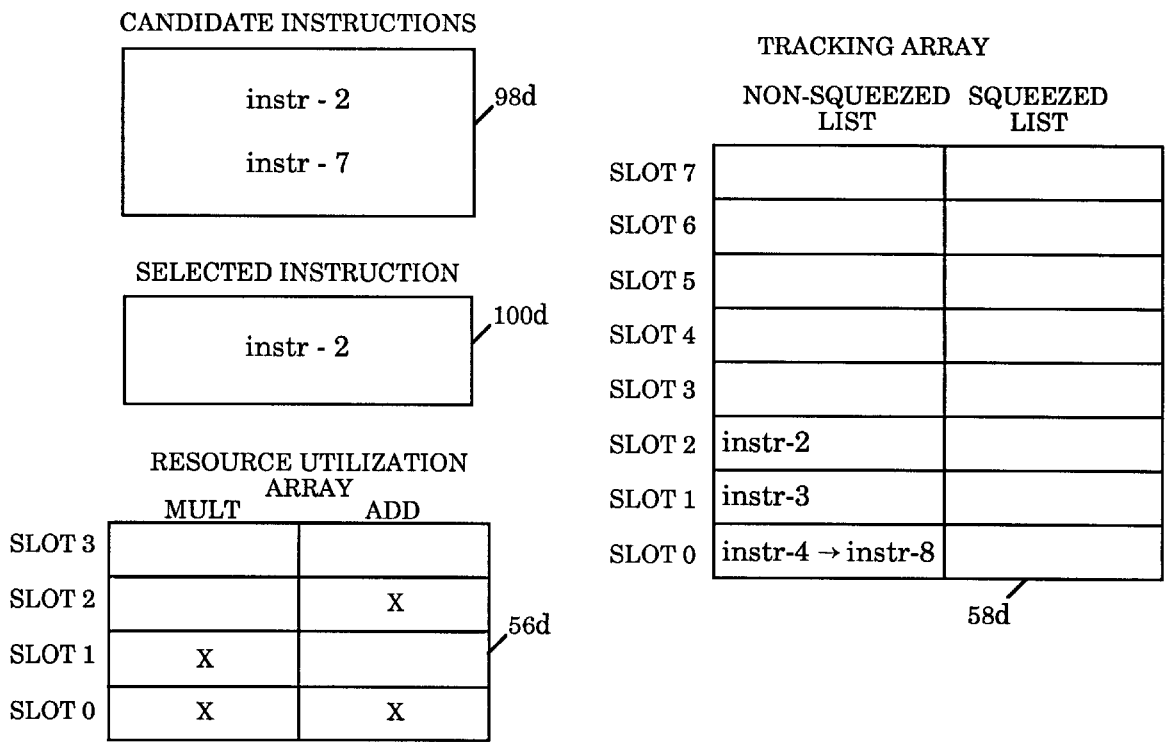

As illustrated in FIG. 9d, the improved scheduler refreshes the candidate instruction list again 98d. At this time, the candidate instruction list 98d comprises instr-2, an Add instruction, and instr-7, a Divide instruction. Since instr-2, the Add instruction, originates a predecessor non-squeezed instruction chain with 2 non-squeezed instructions, which is longer than the 1 non-squeezed instruction predecessor non-squeezed instruction chain which originates from instr-7, the Divide instruction, instr-2, the Add instruction, is selected over instr-7, the Divide instruction, 100d. Since instr-2 must be executed before instr-3, and the addition resource is available in slot 2, the selected Add instruction (instr-2) is scheduled for slot 2. Thus, the addition resource is marked used for slot 2, 56d, and instr-2, the Add instruction, is tracked in the non-squeezed list and linked to slot 2, 58d.

Figure 9E:
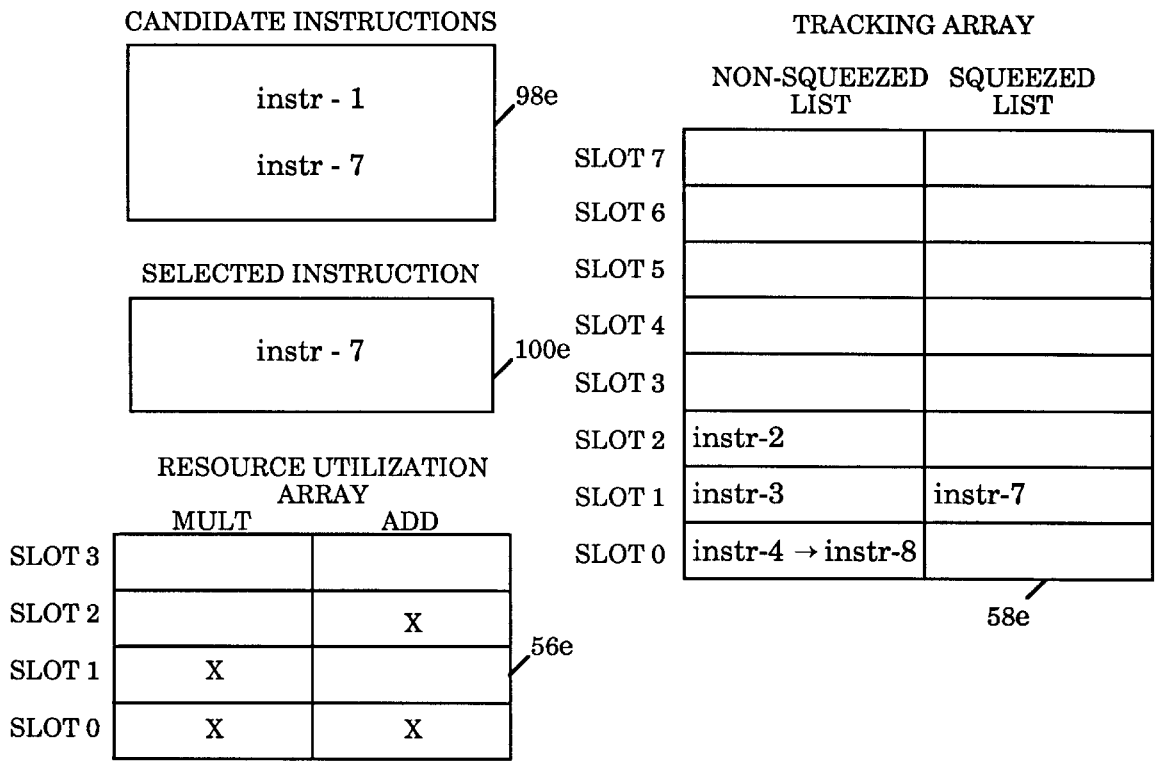

As illustrated in FIG. 9e, the improved scheduler refreshes the candidate instruction list again 98e. At this time, the candidate instruction list 98e comprises instr-1, an Add instruction, and instr-7, a Divide instruction. Since both instr-1 and instr-7 originate a one non-squeezed instruction predecessor non-squeezed instruction chain, the two Divide instructions in instr-7is predecessor chain are used for tie breaking. As a result, instr-7, the Divide instruction, is selected over instr-1, the Add instruction, 100e. Since instr-7 must be executed before instr-8, the selected Divide instruction (instr-7) is scheduled for slot 1. Thus, the resource utilization array is not updated, 56e, and instr-7, the Divide instruction, is tracked in the squeezed list and linked to slot 1, 58e. By implementation convention, squeezed instructions tracked in the squeezed list and linked to a schedule slot are scheduled after the unsqueezed instructions tracked in the unsqueezed list and linked to the same schedule slot.

Figure 9F:
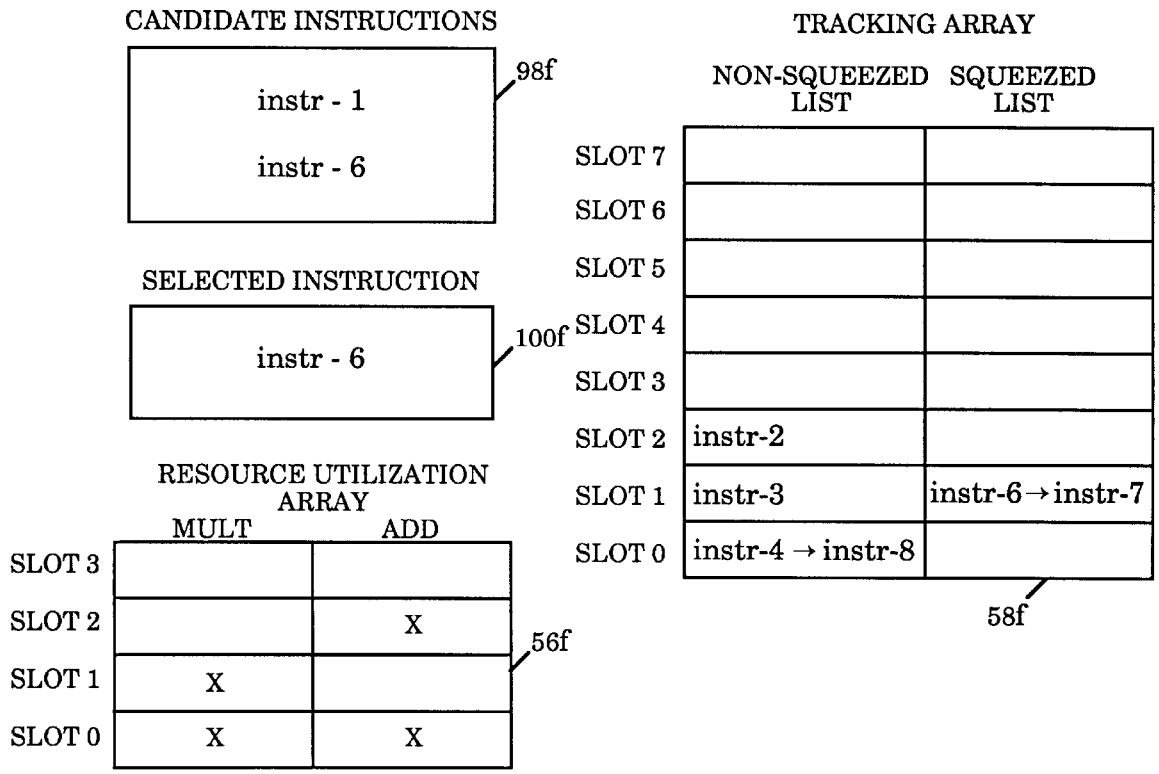

As illustrated in FIG. 9f, the improved scheduler refreshes the candidate instruction list again 98f. At this time, the candidate instruction list 98f comprises instr-1, an Add instruction, and instr-6, a Divide instruction. Since both instr-1 and instr-6 originate a one non-squeezed instruction predecessor non-squeezed instruction chain, the Divide instruction in instr-6's predecessor chain are used for tie breaking. As a result, instr-6, the Divide instruction, is selected over instr-1, the Add instruction, 100f. Since instr-6 must be executed before instr-7, the selected Divide instruction (instr-6) is scheduled for slot 1. Thus, the resource utilization array is not updated, 56f, and instr-6, the Divide instruction, is tracked in the squeezed list and linked to slot 1 in front of instr-7, 58f.

Figure 9G:
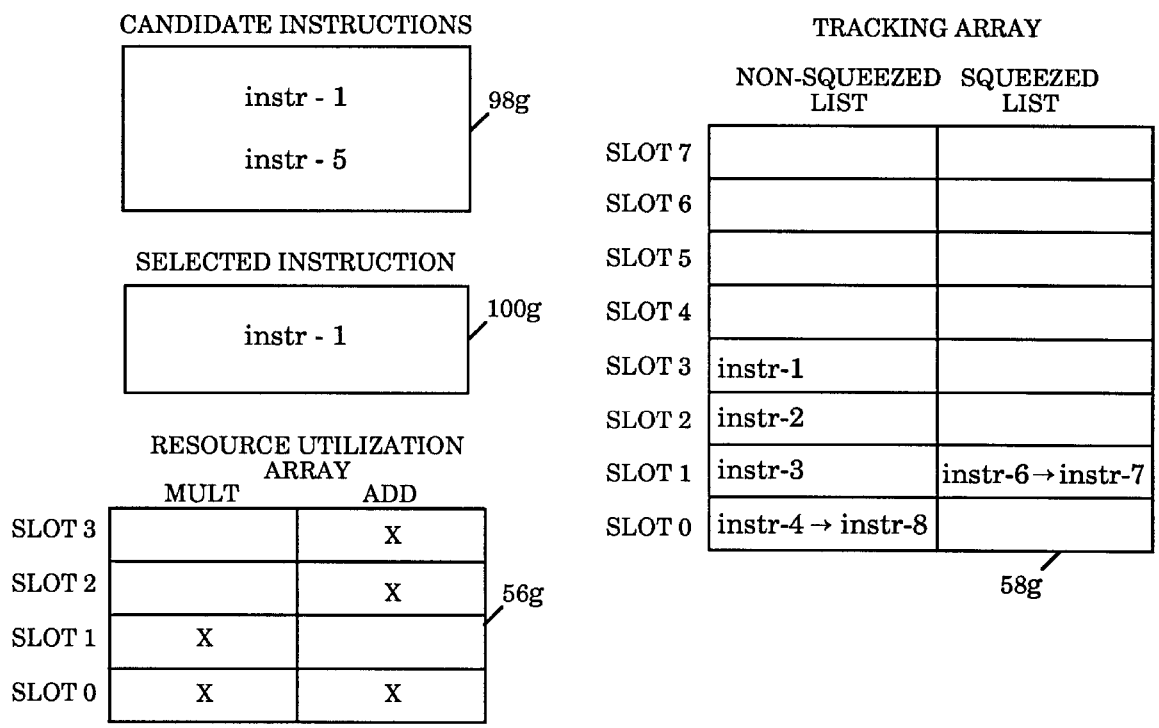

As illustrated in FIG. 9g, the improved scheduler refreshes the candidate instruction list again 98g. At this time, the candidate instruction list 98g comprises instr-1, an Add instruction, and instr-5, also an Add instruction. Since both instr-1 and instr-5 originate a one non-squeezed instruction predecessor non-squeezed instruction chain, and there's no squeezed instructions to be used for tie breaking, instr-1, the Add instruction, which has been ready to be schedule for a longer time is selected over instr-5, the other Add instruction, 100g. Since instr-1 must be executed before instr-2, and the addition resource is available in slot 3, the selected Add instruction (instr-1) is scheduled for slot 3. Thus, the addition resource is marked used for slot 3, 56g, and instr-1, the Add instruction, is tracked in the non-squeezed list and linked to slot 3, 58g.

Figure 9H:
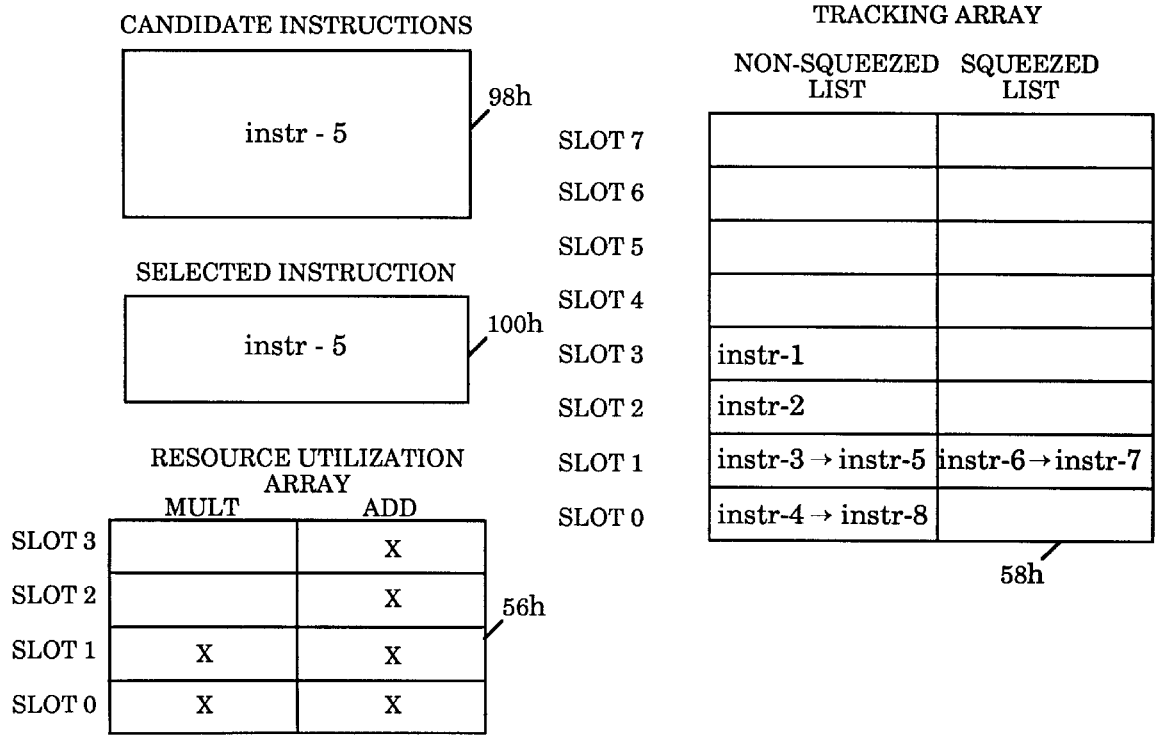

As illustrated in FIG. 9h, the improved scheduler refreshes the candidate instruction list again 98h. At this time, the candidate instruction list 98h comprises only instr-5, an Add instruction. Thus, instr-5, the Add instruction, is selected, 100h. Since instr-5 must be executed before instr-6, and the addition resource is available in slot 1, the selected Add instruction (instr-5) is scheduled for slot 1. Thus, the addition resource is marked used for slot 1, 56h, and instr-5, the Add instruction, is tracked in the non-squeezed list and linked to slot 1 through instr-3, 58h.

Since at this time all instructions have been scheduled, no new candidate instructions will be added to the candidate instruction list as the improved scheduler attempts to refresh the candidate instruction list again. Thus, the candidate instruction list becomes empty. Upon detecting that the candidate instruction list is empty, the improved scheduler terminates the attempt step. The improved scheduler was successful in scheduling the instructions in a schedule with size 4 (not counting squeezed instructions). This schedule is illustrated in FIG. 10a. In contrast, the longer schedule generated under the prior art list scheduling technique is illustrated in FIG. 10b.

While the present invention has been described in terms of presently preferred and alternate embodiments, those skilled in the art will recognize that the invention is not limited to the embodiments described. The method and apparatus of the present invention can be practiced with modification and alteration within the spirit and scope of the appended claims. The description is thus to be regarded as illustrative instead of limiting on the present invention.

What is claimed is:

1. In a computer system comprising a compiler compiling a plurality of programs targeted for a multi-issue architecture computer, a method implemented by a scheduler of said compiler for determining an execution schedule for executing a basic block of one of said programs on said targeted computer, said method comprising the steps of:

a) setting a schedule size for said execution schedule to be determined in an architectural dependent manner;

b) generating a plurality of unassigned schedule slots based on said schedule size, the number of unassigned schedule slots generated being a function of said schedule size;

c) selecting an instruction of said basic block using a plurality of priority functions, said priority functions distinguishing squeezed instructions from non-squeezed instructions of said basic block, and factoring said distinction into their priority evaluations said squeezed instructions being instructions that cannot be issued in parallel whereas said non-squeezed instructions are instructions that can be issued in parallel;

d) assigning said selected instruction to one of said unassigned schedule slots without violating resource constraints of said target machine and precedence constraints of said instructions of said basic block;

e) repeating said steps c) through d) until all instructions of said basic block have been scheduled.

2. The method as set forth in claim 1, wherein, said step b) further comprises building an ordered candidate instruction list comprising instructions of said basic block;

said step c) is performed in a selected one of a top down (predecessor free) and a bottom up (successor free) manner using said ordered candidate instruction list; and said step d) further comprises refreshing said ordered candidate instruction list upon assigning the selected instruction to one of said unassigned schedule slots.

3. The method as set forth in claim 1, wherein, said step b) further comprises initializing a resource utilization array based on said schedule size for tracking resource utilization by scheduled non-squeezed instructions of said basic block, said resource utilization array initialized comprising n rows and r columns, each row tracking resource utilization by non-squeezed instructions scheduled for one of said schedule slots, each column tracking a resource of said target machine that can be used in parallel with another resource by non-squeezed instructions;

said step d) further comprises updating said resource utilization array accordingly upon assigning the selected instruction to one of said unassigned schedule slots.

4. The method as set forth in claim 1, wherein, said step b) further comprises initializing an instruction tracking array based on said schedule size for separately tracking and linking resource utilization by scheduled non-squeezed and squeezed instructions of said basic block, said instruction tracking array initialized comprising m rows and two columns, each row separately tracking and linking scheduled squeezed and non-squeezed instructions to one of said schedule slots, with a first of said two columns tracking and linking scheduled non-squeezed instructions, and a second of said two columns tracking and linking scheduled squeezed instructions;

said step d) further comprises updating said instruction tracking array accordingly upon assigning the selected instruction to one of said unassigned schedule slots.

5. The method as set forth in claim 1, wherein, said step c) uses priority functions that prioritize a first candidate instruction originating a longer non-squeezed instruction chain over a second candidate instruction originating a shorter non-squeezed instruction chain, if said first and second candidate instructions both originating instruction chains having the same number of non-squeezed instructions, and said first candidate instruction chain has more squeezed instruction than said second candidate instruction, said priority functions prioritizing said first candidate instruction over said second candidate instruction, and if said first and second candidate instructions both originating instruction chains having the same number of squeezed and non-squeezed instructions, and said first candidate instruction has been ready to be scheduled longer than said second candidate instruction, said priority functions prioritizing said first candidate instruction over said second candidate instruction.

6. The method as set forth in claim 1, wherein, said basic block is a program loop;

said execution schedule to be determined for said program loop is additionally software pipelined;

said step a) sets said schedule size to a minimum schedule size which is determined factoring into consideration only said non-squeezed instructions of said basic block;

said step e) is further prematurely terminated whenever said step c) fails to assign the selected instruction to an unassigned schedule slot; and said method further comprises the steps of f) incrementing said schedule size in a predetermined manner whenever said step e) is prematurely terminated, and g) repeating said steps b) through f) until either said step e) is terminated because all instructions of said basic block having been scheduled or said step f) has reached a maximum schedule size, which is equal to the number of instruction of said program loop.

7. In a computer system comprising a compiler compiling a plurality of programs targeted for a multi-issue architecture computer, an apparatus for determining an execution schedule for executing a basic block of one of said programs on said targeted computer, said apparatus comprising:

a) setting means for setting a schedule size for said execution schedule to be determined in an architectural dependent manner;

b) initialization means coupled to said setting means for generating a plurality of unassigned schedule slots based on said schedule size, the number of unassigned schedule slots generated being a function of said schedule size;

c) selection means for selecting an instruction of said basic block using a plurality of priority functions, said priority functions distinguishing squeezed instructions from non-squeezed instructions of said basic block, and factoring said distinction into their priority evaluations, said squeezed instructions being instructions that cannot be issued in parallel whereas said non-squeezed instructions are instructions that can be issued in parallel;

d) assignment means coupled to said initialization and selection means for assigning said selected instruction to one of said unassigned schedule slots without violating resource constraints of said target machine and precedence constraints of said instructions of said basic block; and e) control means coupled to said selection and assignment means for repeatedly invoking said selection and assignment means to select and assign instructions of said basic blocks to said unassigned schedule slots, until all instructions of said basic block have been scheduled.

8. The apparatus as set forth in claim 7, wherein, said initialization means is further equipped to build an ordered candidate instruction list comprising instructions of said basic block;

said selection means is equipped to select an instruction in a selected one of a top down (predecessor free) and a bottom up (successor free) manner using said ordered candidate instruction list; and said assignment means is further equipped to refresh said ordered candidate instruction list upon assigning the selected instruction to one of said unassigned schedule slots.

9. The apparatus as set forth in claim 7, wherein, said initialization means is further equipped to initialize a resource utilization array based on said schedule size for tracking resource utilization by scheduled non-squeezed instructions of said basic block, said resource utilization array being initialized with n rows and r columns, each row tracking resource utilization by non-squeezed instructions scheduled for one of said schedule slots, each column tracking a resource of said target machine that can be used in parallel with another resource by non-squeezed instructions;

said assignment means is further equipped to update said resource utilization array accordingly upon assigning the selected instruction to one of said unassigned schedule slots.

10. The apparatus as set forth in claim 7, wherein, said initialization means is further equipped to initialize an instruction tracking array based on said schedule size for separately tracking and linking resource utilization by scheduled non-squeezed and squeezed instructions of said basic block, said instruction tracking array being initialized with m rows and two columns, each row separately tracking and linking scheduled squeezed and non-squeezed instructions to one of said schedule slots, with a first of the two columns tracking and linking scheduled non-squeezed instructions, and a second of the two columns tacking and linking scheduled squeezed instructions;

said assignment means is further equipped to update said instruction tracking array accordingly upon assigning the selected instruction to one of said unassigned schedule slots.

11. The apparatus as set forth in claim 7, wherein, said selection means is equipped to use priority functions that prioritizes a first candidate instruction originating a longer non-squeezed instruction chain over a second candidate instruction originating a shorter non-squeezed instruction chain, if said first and second candidate instructions both originating instruction chains having the same number of non-squeezed instructions, and said first candidate instruction chain has more squeezed instruction than said second candidate instruction, said priority functions prioritizing said first candidate instruction over said second candidate instruction, and if said first and second candidate instruction both originating instruction chains having the same number of squeezed and non-squeezed instructions, and said first candidate instruction has been ready to be scheduled longer than said second candidate instruction, said priority functions prioritizing said first candidate instruction over said second candidate instruction.

12. The apparatus as set forth in claim 7, wherein, said basic block is a program loop;

said execution schedule to be determined for said program loop is additionally software pipelined;

said setting means is equipped to set said schedule size to a minimum schedule size which is determined factoring into consideration only non-squeezed instructions of said basic block;

said control means is further equipped to prematurely terminates said repeated invocations of said selection and assignment means whenever said assignment means fails to assign the selected instruction to an unassigned schedule slot;

said setting means is further coupled to said control means, and equipped to increment said schedule size in a predetermined manner whenever said control means prematurely terminates said repeated invocations of said selection and assignment means;

said control means is further coupled to said initialization means, and equipped to reinvoke said initialization means to regenerate a new plurality of unassigned schedule slots, and then repeatedly reinvoke said selection and assignment means all over again to determine said execution schedule upon invoking said setting means to increment said schedule size.

13. In a computer system comprising a compiler compiling a plurality of programs targeted for a multi-issue architecture computer, a scheduler for determining an execution schedule for executing a basic block of one of said programs on said targeted computer, said scheduler comprising:

a) set program function means for setting a schedule size for said execution schedule to be determined in an architectural dependent manner;

b) initialize program function means having access to said set schedule size for generating a plurality of unassigned schedule slots based on said schedule size, the number of unassigned schedule slots generated being a function of said schedule size;

c) select program function means having access to instructions of said basic block for selecting an instruction using a plurality of priority functions, said priority functions distinguishing squeezed instructions from non-squeezed instructions of said basic block, and factoring said distinction into their priority evaluations, said squeezed instructions being instructions that cannot be issued in parallel whereas said non-squeezed instructions are instructions that can be issued in parallel;

d) assign program function means having access to said selected instruction and said unassigned schedule slots for assigning the selected instruction to one of said unassigned schedule slots without violating resource constraints of said target machine and precedence constraints of said instructions of said basic block; and e) control program function means for repeatedly invoking said select and assign program function means to select and assign instructions of said basic blocks to said unassigned schedule slots, until all instructions of said basic block have been scheduled.

14. The scheduler as set forth in claim 13, wherein, said initialize program function means is further programmed to build an ordered candidate instruction list comprising instructions of said basic block;

said select program function means is programmed to select an instruction in a selected one of a top down (predecessor free) and a bottom up (successor free) manner using said ordered candidate instruction list; and said assign program function means is further programmed to refresh said ordered candidate instruction list upon assigning the selected instruction to one of said unassigned schedule slots.

15. The scheduler as set forth in claim 13, wherein, said initialize program function means is further programmed to initialize a resource utilization array based on said schedule size for tracking resource utilization by scheduled non-squeezed instructions of said basic block, said resource utilization array being initialized with n rows and r columns, each row tracking resource utilization by non-squeezed instructions scheduled for one of said schedule slots, each column tracking a resource of said target machine that can be used in parallel with another resource by non-squeezed instructions;

said assign program function means is further programmed to update said resource utilization array accordingly upon assigning the selected instruction to one of said unassigned schedule slots.

16. The scheduler as set forth in claim 13, wherein, said initialize program function means is further programmed to initialize an instruction tracking array based on said schedule size for separately tracking and linking resource utilization by scheduled non-squeezed and squeezed instructions of said basic block, said instruction tracking array being initialized with m rows and two columns, each row separately tracking and linking scheduled squeezed and non-squeezed instructions to one of said schedule slots, with a first of the two columns tracking and linking scheduled non-squeezed instructions, and a second of the two columns tracking and linking scheduled squeezed instructions;

said assign program function means is further equipped to update said instruction tracking array accordingly upon assigning the selected instruction to one of said unassigned schedule slots.

17. The scheduler as set forth in claim 13, wherein, said select program function means is programmed to use priority functions that prioritizes a first candidate instruction originating a longer non-squeezed instruction chain over a second candidate instruction originating a shorter non-squeezed instruction chain, if said first and second candidate instructions both originating instruction chains having the same number of non-squeezed instructions, and said first candidate instruction chain has more squeezed instruction than said second candidate instruction, said priority functions prioritizing said first candidate instruction over said second candidate instruction, and if said first and second candidate instruction both originating instruction chains having the same number of squeezed and non-squeezed instructions, and said first candidate instruction has been ready to be scheduled longer than said second candidate instruction, said priority functions prioritizing said first candidate instruction over said second candidate instruction.

18. The scheduler as set forth in claim 13, wherein, said basic block is a program loop;

said execution schedule to be determined for said program loop is additionally software pipelined;

said set program function means is programmed to set said schedule size to a minimum schedule size which is determined factoring into consideration only non-squeezed instructions of said basic block;

said control program function means is further programmed to prematurely terminates said repeated invocations of said select and assign program functions means whenever said assign program function means fails to assign the selected instruction to an unassigned schedule slot;

said set program function means is further programmed to increment said schedule size in a predetermined manner whenever said control program function means prematurely terminates said repeated invocations of said select and assign program function means;

said control program function means is further programmed to reinvoke said initialize program function means to regenerate a new plurality of unassigned schedule slots, and then repeatedly reinvoke said select and assign program function means all over again to determine said execution schedule upon invoking said set program function means to increment said schedule size.

19. In a computer system comprising a compiler compiling a plurality of programs targeted for a multi-issue architecture computer, an improved code generator of said compiler for generating executable code for said programs being compiled, the improvement comprising:

a) a scheduler for determining an execution schedule for executing a basic block of one of said programs on said targeted computer, said scheduler having a.1) set program function means for setting a schedule size for said execution schedule to be determined in an architectural dependent manner;

a.2) initialize program function means having access to said set schedule size for generating a plurality of unassigned schedule slots based on said schedule size, the number of unassigned schedule slots generated being a function of said schedule size;

a.3) select program function means having access to instructions of said basic block for selecting an instruction using a plurality of priority functions, said priority functions distinguishing squeezed instructions from non-squeezed instructions of said basic block, and factoring said distinction into their priority evaluations, said squeezed instructions being instructions that cannot be issued in parallel whereas said non-squeezed instructions are instructions that can be issued in parallel;

a.4) assign program function means having access to said selected instruction and said unassigned schedule slots for assigning the selected instruction to one of said unassigned schedule slots without violating resource constraints of said target machine and precedence constraints of said instructions of said basic block; and a.5) control program function means for repeatedly invoking said select and assign program function means to select and assign instructions of said basic blocks to said unassigned schedule slots, until all instructions of said basic block have been scheduled.

20. The code generator as set forth in claim 19, wherein, said basic block is a program loop;

said execution schedule to be determined for said program loop is additionally software pipelined;

said set program function means is programmed to set said schedule size to a minimum schedule size which is determined factoring into consideration only non-squeezed instructions of said basic block;

said control program function means is further programmed to prematurely terminates said repeated invocations of said select and assign program functions means whenever said assign program function means fails to assign the selected instruction to an unassigned schedule slot;

said set program function means is further programmed to increment said schedule size in a predetermined manner whenever said control program function means prematurely terminates said repeated invocations of said select and assign program function means;

said control program function means is further programmed to reinvoke said initialize program function means to regenerate a new plurality of unassigned schedule slots, and then repeatedly reinvoke said select and assign program function means all over again to determine said execution schedule upon invoking said set program function means to increment said schedule size.

21. In a computer system, an improved compiler for compiling a program targeted for a multi-issue architecture computer, the improvement comprising:

a) a scheduler for determining an execution schedule for executing a basic block of one of said programs on said targeted computer, said scheduler having a.1) set program function means for setting a schedule size for said execution schedule to be determined in an architectural dependent manner;

a.2) initialize program function means having access to said set schedule size for generating a plurality of unassigned schedule slots based on said schedule size, the number of unassigned schedule slots generated being a function of said schedule size;

a.3) select program function means having access to instructions of said basic block for selecting an instruction using a plurality of priority functions, said priority functions distinguishing squeezed instructions from non-squeezed instructions of said basic block, and factoring said distinction into their priority evaluations, said squeezed instructions being instructions that cannot be issued in parallel whereas said non-squeezed instructions are instructions that can be issued in parallel;

a.4) assign program function means having access to said selected instructions and said unassigned schedule slots for assigning the selected instruction to one of said unassigned schedule slots without violating resource constraints of said target machine and precedence constraints of said instructions of said basic block;

a.5) control program function means for repeatedly invoking said select and assign program function means to select and assign instructions of said basic blocks to said unassigned schedule slots, until all instructions of said basic block have been scheduled.

22. The compiler as set forth in claim 21, wherein, said basic block is a program loop;

said execution schedule to be determined for said program loop is additionally software pipelined;

said set program function means is programmed to set said schedule size to a minimum schedule size which is determined factoring into consideration only non-squeezed instructions of said basic block;

said control program function means is further programmed to prematurely terminates said repeated invocations of said select and assign program functions means whenever said assign program function means fails to assign the selected instruction to an unassigned schedule slot;

said set program function means is further programmed to increment said schedule size in a predetermined manner whenever said control program function means prematurely terminates said repeated invocations of said select and assign program function means;

said control program function means is further programmed to reinvoke said initialize program function means to regenerate a new plurality of unassigned schedule slots, and then repeatedly reinvoke said select and assign program function means all over again to determine said execution schedule upon invoking said set program function means to increment said schedule size.

23. An improved computer system, the improvement comprising:

a) a scheduler of an compiler for determining an execution schedule for executing a basic block of a program being compiled by said compiler on a targeted computer, said scheduler having a.1) set program function means for setting a schedule size for said execution schedule to be determined in an architectural dependent manner;

a.2) initialize program function means having access to said set schedule size for generating a plurality of unassigned schedule slots based on said schedule size, the number of unassigned schedule slots generated being a function of said schedule size;

a.3) select program function means having access to instructions of said basic block for selecting an instruction using a plurality of priority functions, said priority functions distinguishing squeezed instructions from non-squeezed instructions and factoring said distinction into their priority evaluations, said squeezed instructions being instructions that cannot be issued in parallel whereas said non-squeezed instructions are instructions that can be issued in parallel;

a.4) assign program function means having access to the selected instruction and said unassigned schedule slots for assigning the selected instruction to one of said unassigned schedule slots without violating resource constraints of said target machine and precedence constraints of said instructions of said basic block;

a.5) control program function means for repeatedly invoking said select and assign program function means to select and assign instructions of said basic blocks to said unassigned schedule slots, until all instructions of said basic block have been scheduled.

24. The computer system as set forth in claim 23, wherein, said basic block is a program loop;

said execution schedule to be determined for said program loop is additionally software pipelined;

said set program function means is programmed to set said schedule size to a minimum schedule size which is determined factoring into consideration only non-squeezed instructions of said basic block;

said control program function means is further programmed to prematurely terminates said repeated invocations of said select and assign program functions means whenever said assign program function means fails to assign the selected instruction to an unassigned schedule slot;

said set program function means is further programmed to increment said schedule size in a predetermined manner whenever said control program function means prematurely terminates said repeated invocations of said select and assign program function means;

said control program function means is further programmed to reinvoke said initialize program function means to regenerate a new plurality of unassigned schedule slots, and then repeatedly reinvoke said select and assign program function means all over again to determine said execution schedule upon invoking said set program function means to increment said schedule size.

* * * * *